(12) United States Patent
Demandolx (10) Patent No.: US 8,644,640 B2
(45) Date of Patent: Feb. 4, 2014

(54) PURPLE FRINGING ARTIFACT REDUCTION WITHIN A DIGITAL IMAGE WITH GUIDANCE FROM A GREEN CHANNEL

(75) Inventor: Denis Demandolx, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1038 days.

(21) Appl. No.: 12/472,565

(22) Filed: May 27, 2009

(65) Prior Publication Data

US 2010/0303350 A1 Dec. 2, 2010

(51) Int. Cl.
*G06K 9/40* (2006.01)

(52) U.S. Cl.
USPC ........... 382/275; 382/167; 382/274; 382/300; 345/600; 348/273

(58) Field of Classification Search
USPC .................. 382/167, 274, 275, 300; 345/600; 348/273; 381/167, 274, 275, 300
See application file for complete search history.

(56) References Cited

U.S. PATENT DOCUMENTS

| 2005/0201616 A1* | 9/2005 | Malvar et al. ................. 382/167 |
| 2006/0017855 A1 | 1/2006 | Yamada |
| 2006/0098253 A1 | 5/2006 | Masuno et al. |
| 2006/0251322 A1 | 11/2006 | Palum et al. |
| 2007/0153341 A1 | 7/2007 | Kang |
| 2008/0137947 A1* | 6/2008 | Sawada et al. ................. 382/167 |
| 2008/0170248 A1 | 7/2008 | Kang et al. |
| 2010/0177962 A1* | 7/2010 | Kalman ........................ 382/167 |

OTHER PUBLICATIONS

Kim et al. "Automatic detection and correction of purple fringing using the gradient information and desaturation"; 16th European Signal Processing Conference, Switzerland, Aug. 25-29, 2008.*
"Purple Fringing Reduction", Retrieved at <<http://tams-www.informatik.uni-hamburg.de/applets/hades/webdemos/00-intro/02-imageprocessing/purple.html>>, Apr. 3, 2009, p. 1.
"FotoNation", "Digital Correction of Purple Fringing and Other Chromatic Aberrations", Retrieved at <<http://www.fotonation.com/cmsfiles/whitepapers/chromafix.pdf>>, Mar. 2008, pp. 2.
Mendham, Scott, "Removing Purple Fringing", Retrieved at <<http://www.pcworld.idg.com.au/article/75955/removing_purple_fringing?fp=2&fpid=1585691688>>, Jan. 29, 2004, pp. 1-3.
"pictureline.com", "Purple Fringe", Retrieved at <<http://www.pictureline.com/newsletter/article.php?id=311>>, vol. 2, No. 7, Jul. 2004, pp. 1-2.

(Continued)

*Primary Examiner* — Chan S Park
*Assistant Examiner* — Eueng-Nan Yeh (57) ABSTRACT

Methods and a processing device are provided for reducing purple fringing artifacts appearing in a digital image. A linear filter may be applied to a digital image to identify purplish candidate regions of pixels. Ones of pixels that are in any of the purplish candidate regions and are within a predefined distance of a high gradient/high contrast region may be identified as damaged pixels. A map of the damaged pixels may then be created, or formed. The damaged pixels may be reconstructed based on interpolation of values from undamaged pixels on a fringe boundary with guidance from a green channel. In various embodiments, the damaged pixels may be reconstructed based on a Poisson blending approach, an approximated Poisson blending approach, or a variety of approaches based on interpolation of values from undamaged pixels on a fringe boundary, with guidance from a green channel.

30 Claims, 5 Drawing Sheets

(56) References Cited

OTHER PUBLICATIONS

"Photo.net", "How to Eliminate Purple Fringing?", Retrieved at <<http://photo.net/digital-darkroom-forum/006JMx>>, Oct. 23, 2003, pp. 1-2.

Perez, Patrick et al., "Poisson Image Editing", ACM Transactions on Graphics, 22(3), 2003, pp. 313-318, (published before this application May 2009).

* cited by examiner

PURPLE FRINGING ARTIFACT REDUCTION WITHIN A DIGITAL IMAGE WITH GUIDANCE FROM A GREEN CHANNEL

BACKGROUND

In photography, a refractive index of a lens is wavelength-dependent, thereby causing chromatic aberrations due to different colored light being focused at different spatial locations. One variant of chromatic aberration is purple fringing, which can be observed as bluish/purplish colors in a digital image, particularly near high contrast areas where blue and red photons from brighter areas contaminate adjacent darker areas of the digital image.

Various solutions for reducing purple fringing in digital images have been proposed. One proposed solution desaturates purple areas that are adjacent to a nearly overexposed area when a value of a red channel and a value of a blue channel are each greater than a value of a green channel. Although the proposed solution reduces purple fringing, the desaturated purple areas may lose color information and appear as a shade of gray.

A second proposed solution restores the red channel and the blue channel in purple areas by calculating gradients and lines of greatest slope in all colors (red, green and blue) and interpolating a least saturated value of a red channel and a blue channel, respectively, on a dark side of a line of greatest slope, with a least saturated value of the red channel and the blue channel, respectively, on a bright side of the steep gradient. An interpolation factor is driven by a difference in value of the green channel from the dark side of the line of greatest slope, to the bright side of the line of greatest slope, However, the second proposed solution suffers from a number of problems, including being subject to noise due to being gradient sensitive.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, methods and a processing device are provided for reducing purple fringing artifacts in a digital image. A linear filter may be applied to pixels of a digital image in order to identify purplish candidate regions of pixels. Ones of the pixels that are in one of the purplish candidate regions and within a predefined distance of a high gradient region or a high contrast region may be identified as pixels damaged by purple fringing artifacts. A map of the damaged pixels may then be created, or formed. Using the map of the damaged pixels, the damaged pixels may be reconstructed based on interpolation of values from undamaged pixels on a fringe boundary with guidance from a green channel.

In some embodiments, the damaged pixels may be reconstructed based on a Poisson blending approach. In other embodiments, the damaged pixels may be constructed based on an approximated Poisson blending approach, including, but not limited to a multilinear approach. In a third group of embodiments, a variety of approaches may be used to reconstruct the damaged pixels based on interpolation of values from undamaged pixels on a fringe boundary, with guidance from a green channel.

DRAWINGS

In order to describe the manner in which the above-recited and other advantages and features can be obtained, a more particular description is discussed below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, methods and a processing device are disclosed that more accurately detect pixels damaged by purple fringing and reconstructs values of a red channel and values of a blue channel of the damaged pixels based on interpolation of values of the red channel and values of the blue channel of undamaged pixels at a boundary of a purple fringing region (a fringe boundary), using a green channel as a guiding distribution.

In various embodiments, purplish candidate regions of a digital image may be found by applying a linear filter to the digital image to identify one or more purplish candidate regions of pixels. The pixels of the one or more purplish candidate regions that are within a predefined distance of a high gradient or a high contrast region may be identified as being damaged by purple fringing and may be included in a map of damaged pixels. The values of the red channel and the blue channel of the damaged pixels may be discarded and reconstructed.

In one embodiment, the pixels damaged by purple fringing may be reconstructed according to a method called Poisson blending, in which an interpolant, or membrane, for reconstructing damaged pixels in a purple fringing region may be defined as a solution to a minimization problem, which may be a unique solution of a Poisson equation with Dirichlet boundary conditions.

In a second embodiment, an approximated Poisson blending approach may be used to reconstruct the damaged pixels in a purple fringing region. The values of the blue channel and the values of the red channel may be reconstructed based on using a multilinear interpolation approach to interpolate the values of the blue channel and the values of the red channel from undamaged pixels at a boundary of the purple fringing region.

In other embodiments, other methods may be employed to reconstruct the damaged pixels in a purple fringing region by interpolation, with guidance from the green channel, using the values of the blue channel and the values of the red channel of the undamaged pixels at the boundary of the purple fringing region.

Exemplary Processing Device

Figure 1:
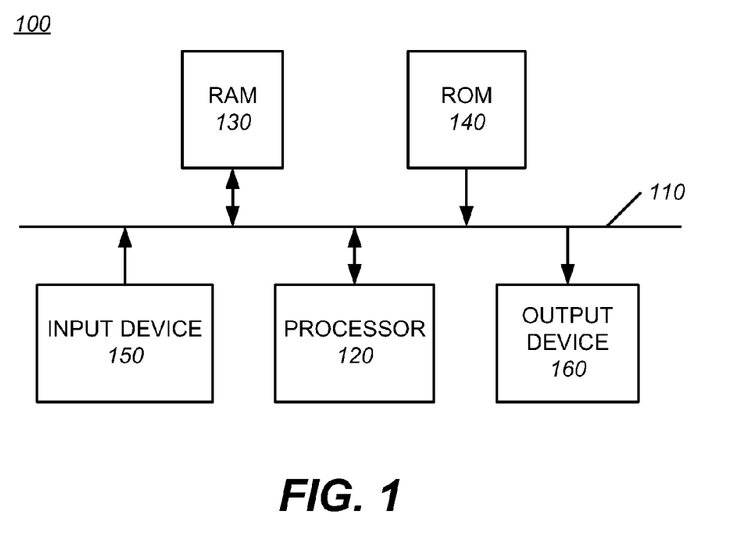
FIG. 1 is a block diagram of an exemplary processing device, which may be used to implement embodiments consistent with subject matter of this disclosure.

FIG. 1 is a diagram of an exemplary processing device 100, which may be used to implement embodiments consistent with the subject matter of this disclosure. Processing device 100 may be a personal computer (PC), a handheld processing device, a digital image capturing device, including, but not limited to a digital camera, or another type of processing device. Processing device 100 may include a bus 110, a processor 120, a random access memory (RAM) 130, a read only memory (ROM) 140, an input device 150, and an output device 160. Bus 110 may connect processor 120, RAM 130, ROM 140 and output device 160.

Processor 120 may include one or more conventional processors that interpret and execute instructions, including, but not limited to a central processing unit (CPU) and a graphics processing unit (GPU). A memory may include RAM 130, ROM 140, and/or another type of dynamic or static storage device that stores information and instructions for execution by processor 120. RAM 130, or another type of dynamic storage device, may store instructions as well as temporary variables or other intermediate information used during execution of instructions by processor 120. ROM 140, or another type of static storage device, may store static information and instructions for processor 120.

Input device 150 may include a keyboard, a pointing device, an electronic pen, a touchscreen, or other device for providing input. Output device 160 may include a display, a printer, or other device for outputting information.

Processing device 100 may perform functions in response to processor 120 executing sequences of instructions contained in a tangible machine-readable medium, such as, for example, RAM 130, ROM 140 or other medium. Such instructions may be read into RAM 130 from another machine-readable medium or from a separate device via a communication interface (not shown).

Purple Fringing Artifacts

Figure 2:
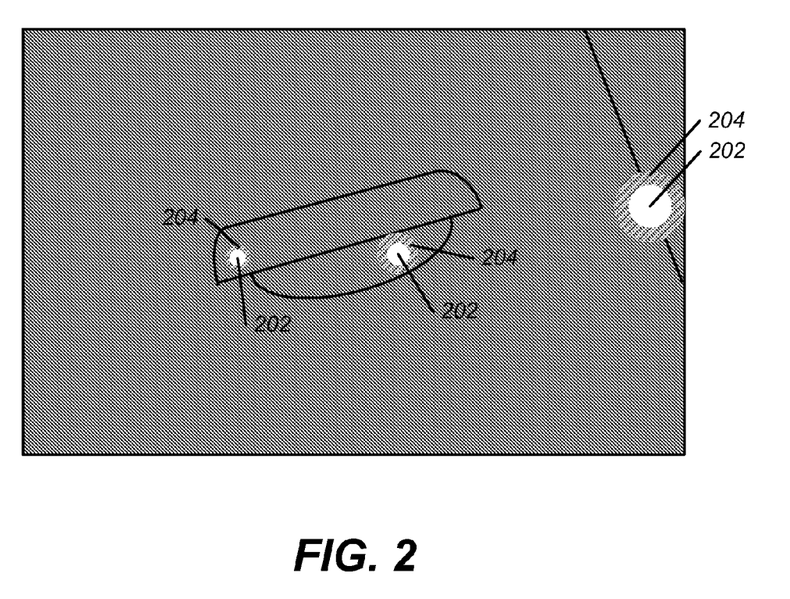
FIG. 2 is a drawing illustrating effects of purple fringing artifacts in a digital image.

FIG. 2 illustrates an example of purple fringing artifacts, which may occur in a digital image. FIG. 2 is a drawing representing a digital photograph of a portion of a door and door handle of a dark-colored automobile. Areas 202 are bright reflections from a light source, such as, for example, the Sun, a brightly lit lamp, or other light source. Areas 202 may be overexposed, or nearly overexposed and are in close proximity to dark areas (for example, the dark color of the automobile). Areas 204 are exemplary purple fringing artifacts surrounding areas 202 and adjacent to the dark areas.

Exemplary Functional Block Diagram

Figure 3:
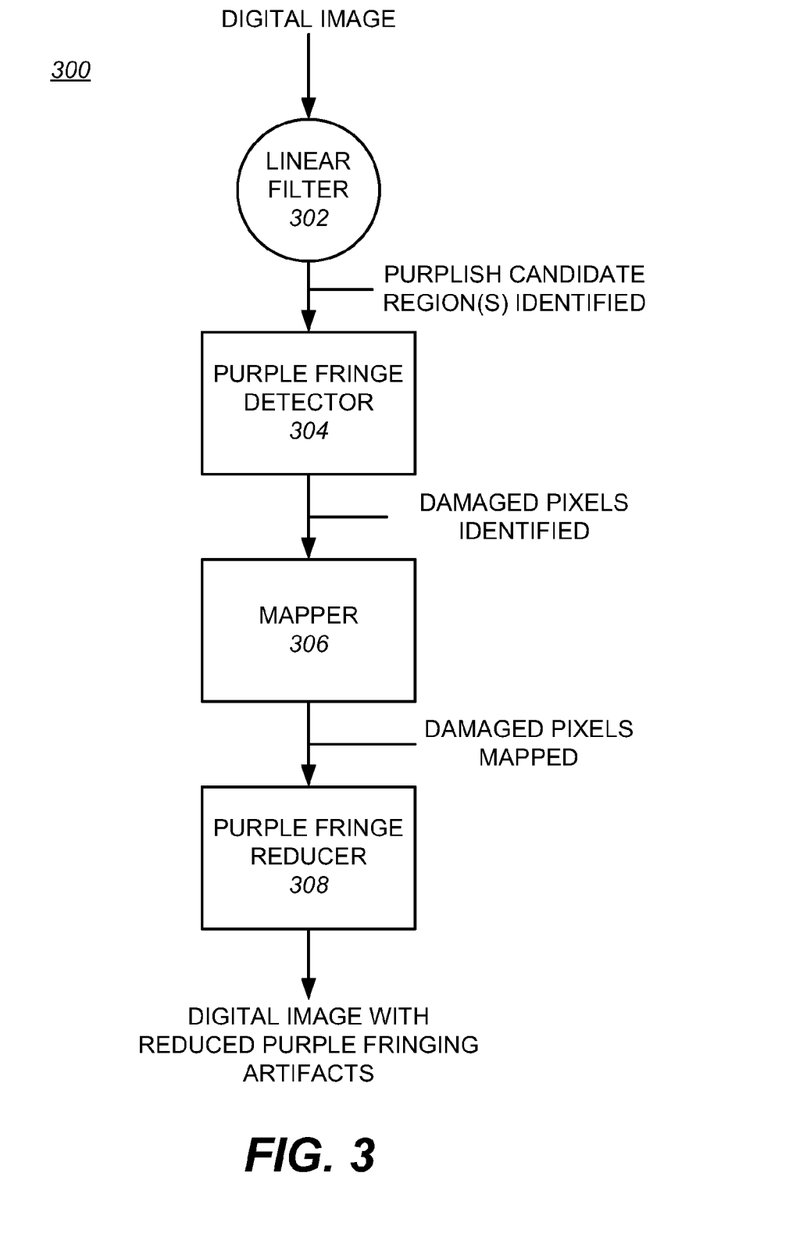
FIG. 3 is a functional block diagram illustrating the functional elements of an exemplary processing device, which may be used to implement embodiments consistent with the subject matter of this disclosure.

FIG. 3 illustrates an exemplary functional block diagram 300 of processing device 100 in embodiments consistent with the subject matter of this disclosure. Functional block diagram 300 includes a linear filter 302, a purple fringe detector 304, a mapper 306 and a purple fringe reducer 308.

Linear filter 302 may filter pixels of a digital image to identify one or more purplish candidate regions of pixels. The pixels of the one or more purplish candidate regions may have a purplish color because of purple fringing artifacts, or because of a purplish colored object appearing in the digital image.

Purple fringe detector 304 may identify high contrast, or high gradient regions within the digital image and may detect whether the pixels of the one or more purplish candidate regions are within a predefined distance of a high gradient or high contrast region. Pixels within the one or more purplish candidate regions that are within the predefined distance of the high gradient or the high contrast region may be considered to be damaged pixels. In some embodiment, the predefined distance may be one pixel or two pixels. In other embodiments, a different number of pixels may be the predefined distance.

Mapper 306 may receive information regarding the damaged pixels and may form, or create, a map of the damaged pixels within the one or more purplish candidate regions.

Purple fringe reducer 308 may reduce purple fringing artifacts by reconstructing the damaged pixels, indicated by the map, via interpolation using values of a blue channel and values of a red channel at undamaged pixels at a boundary of the one or more purplish candidate regions, with a green channel as a guiding distribution. The green channel is unaffected by purple fringing artifacts.

Exemplary Processing

Figure 4:
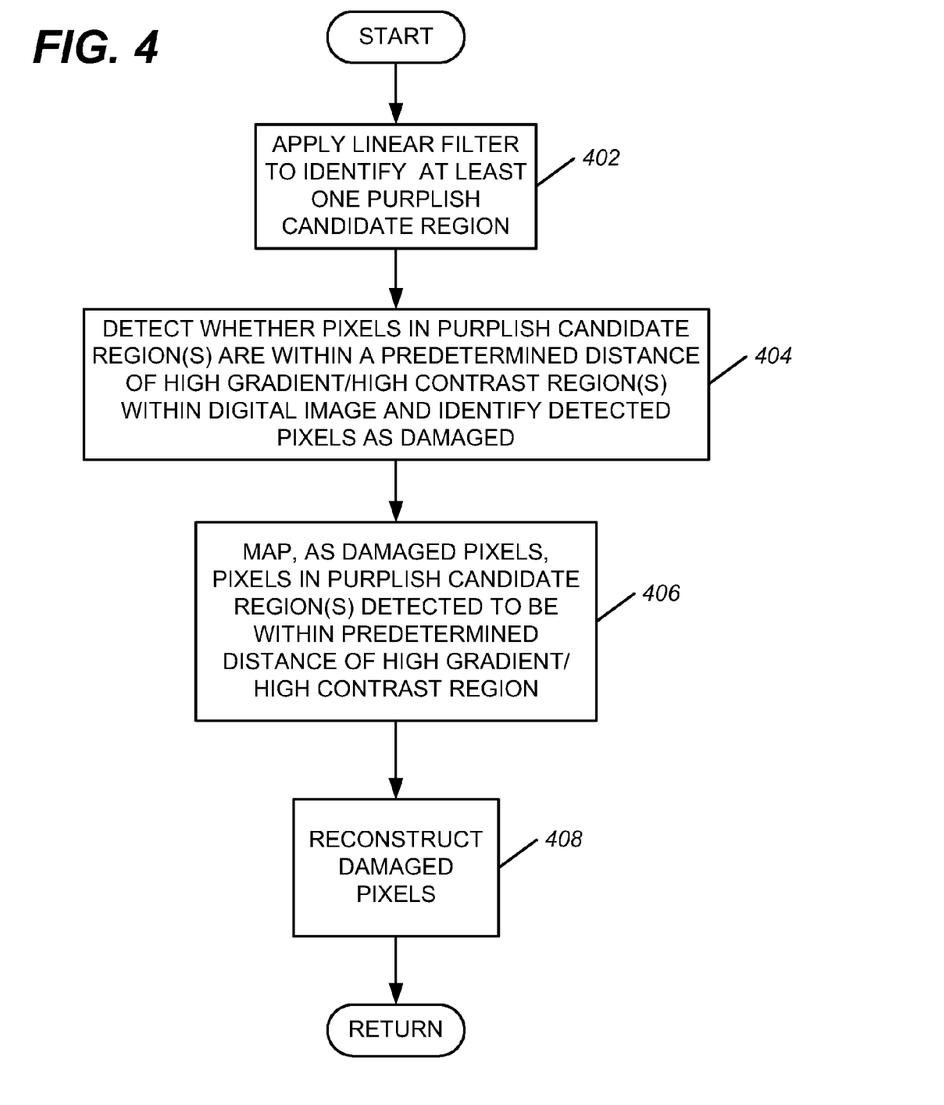
FIG. 4 is a flowchart illustrating exemplary processing, which may be performed in embodiments consistent with the subject matter of this disclosure.

FIG. 4 illustrates an exemplary process which may be performed by a processing device in embodiments consistent with the subject matter of this disclosure. The process may begin with linear filter 302 being applied to a digital image to identify at least one purplish candidate region (act 402). Linear filter 302 may identify pixels within a digital image as being within at least one purplish candidate region when values of a red channel (R), a blue channel (B), and a green channel (G) satisfy one or more inequalities such as, for example:

$$A_{11} \times R + A_{12} \times G + A_{13} \times B > T_1, \text{ and}$$

$$A_{21} \times R + A_{22} \times G + A_{23} \times B > T_2, \text{ and}$$

$$A_{31} \times R + A_{32} \times G + A_{33} \times B > T3.$$

$A_{ij}$, where i and j are integers from 1 to 3, are multiplicative coefficients and $T_k$, where k is an integer from 1 to 3, are thresholds.

Values for $A_{ij}$ and $T_k$ may be determined experimentally by using values for $A_{ij}$ and $T_k$ that segment purplish areas in digital images closest to a human-made segmentation of purplish areas over a set of sample images. This can be achieved by plotting RGB points in three dimensions and by finding planes that discriminate purple from non-purple pixels (using regular statistical classification methods to minimize a number of classifications that match a classification made by a human).

Next, purple fringe detector 304 may detect whether pixels within the one or more purplish candidate regions are within a predefined distance of a high contrast or high gradient region and may identify the detected pixels as damaged by purple fringing artifacts (act 404). A high gradient region is a region of pixels in which a norm of a local gradient is greater than a given threshold. A formula for calculating a gradient is well known to those of ordinary skill in the art. In some embodiments the predefined distance may be one pixel or two pixels. In other embodiments, the predefined distance may be another number of pixels.

Information about the pixels identified as damaged by purple fringing artifacts may then be provided to mapper 306, which may then create, or form, a map of the damaged pixels, such as, for example, a bit map indicating positions of damaged pixels within a digital image (act 406).

Purple fringe reducer 308 may use the map of the damaged pixels to reconstruct the damaged pixels based on interpolating undamaged pixels at a boundary of the one or more purplish candidate regions that includes the damaged pixels (act 408). The reconstructing may be performed by using a Poisson Blending approach, an approximated Poisson Blending approach, or another approach. The process may then be completed.

Poisson Blending Approach

Poisson Blending is described in "Poisson Image Editing" by Patrick Perez et al., *ACM Transactions on Graphics*, 22(3), 2003, pages 313-318. Using a Poisson blending approach with guidance from a green channel, purple-fringing-artifact-damaged pixels may be reconstructed based on solving a Poisson equation with Dirichlet boundary conditions. For example, a simplest interpolant, or membrane, for recovering a region of pixels damaged by purple fringing artifacts, may be defined as a solution to a minimization problem:

$$\min_f \iint_\Omega |\nabla f|^2 \text{ with } f = f^* \text{ on } \partial\Omega \qquad \text{(Eq. 1)}$$

where f is an unknown function to be estimated in a domain $\Omega$ (region of pixels damaged by purple fringing), f* is a known function outside of $\Omega$, and $\partial\Omega$ is a boundary of $\Omega$.

$$\nabla . = \left[\frac{\partial .}{\partial x}, \frac{\partial .}{\partial y}\right]$$

is a gradient operator. The solution f satisfies:

$$\Delta f = 0 \text{ over } \Omega \text{ with } f = f^* \text{ on } \partial\Omega \qquad \text{(Eq. 2)}$$

where $$\Delta . = \frac{\partial^2 .}{\partial x^2} + \frac{\partial^2 .}{\partial y^2}$$

is a Laplacian operator and may be referred to as a Laplace equation with Dirichlet boundary conditions.

When information about a gradient of the region is known, the minimization problem may be written as:

$$\min_f \iint_\Omega |\nabla f - v|^2 \text{ with } f = f^* \text{ on } \partial\Omega \qquad \text{(Eq. 3)}$$

where v is a guidance gradient. The above minimization problem has a solution, which is a unique solution of a Poisson equation with a Dirichlet boundary condition:

$$\Delta f = div \; v \text{ over } \Omega \text{ with } f = f^* \text{ on } \partial\Omega \qquad \text{(Eq. 4)}$$

where $$div \; v = \frac{\partial u}{\partial x} + \frac{\partial v}{\partial y} \text{ is a divergence of } v = [u, v].$$

If v is a gradient of an existing (guidance) field g (i.e. v=$\nabla$g), then equation (Eq. 4), above, may become a Laplace equation with Dirichlet boundary conditions::
$\Delta$(f−g)=0 over $\Omega$ with f−g=f*−g on $\partial\Omega$, which can be simplified using a correction function $\tilde{f}$ defined as $\tilde{f}$=f−g on $\Omega$.
Using $\tilde{f}$, the equation above becomes:

$\Delta\tilde{f}$=0 over $\Omega$ with $\tilde{f}$=f*−g on $\partial\Omega$

That is, within $\Omega$, an additive correction $\tilde{f}$ is a membrane interpolant of a mismatch (f*−g) between a source and a destination along the boundary $\partial\Omega$. Numerically, this leads to solving a linear system whose size is equal to a number of pixels in the region of pixels damaged by purple fringing artifacts.

In various embodiments, interpolation of a red channel and a blue channel, using the boundary conditions and Poisson blending guided by an adjusted gradient of the green channel is used to reconstruct pixels damaged by purple fringing artifacts. Before using a gradient of the green channel to interpolate the red channel and the blue channel, a distribution of the green channel may be adjusted, such that the distribution of the green channel may have a same mean and variance as the blue channel and the red channel, respectively.

Figure 5:
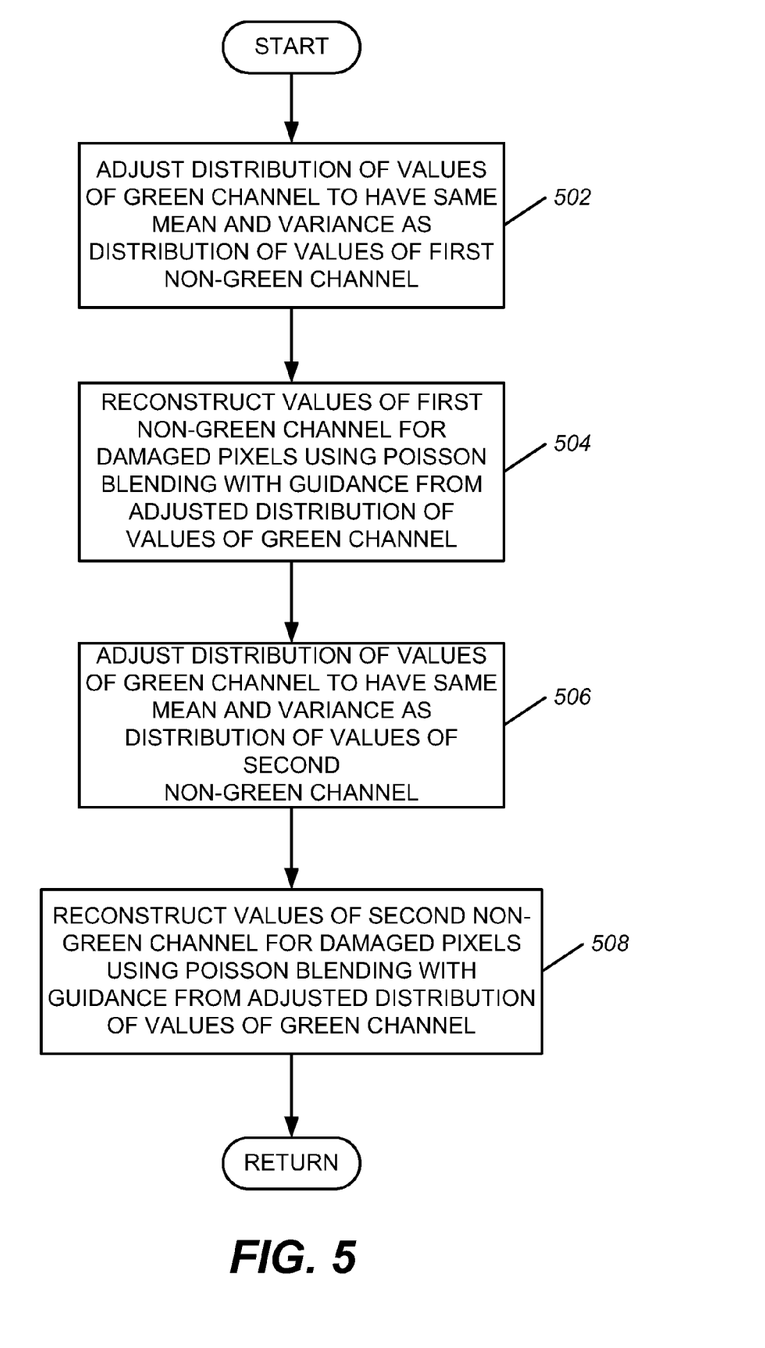
FIG. 5 is a flowchart illustrating exemplary processing in an embodiment using a Poisson blending approach to reconstruct damaged pixels.

FIG. 5 is a flowchart illustrating exemplary processing, with respect to act 408 of FIG. 4, in an embodiment which reconstructs pixels damaged by purple fringing artifacts by using a Poisson blending approach guided by an adjusted gradient of a green channel.

The process may begin with purple fringe reducer 308 adjusting a distribution of values of a green channel to have a same mean and variance as a distribution of a first non-green channel, such as, for example, one of a red channel or a blue channel (act 502). First, the green channel may be normalized according to:

Green_normalized=(Green_original−Green_mean)/Green_standardDeviation, where Green_normalized is a normalized value of the green channel, Green_original is an original value of the green channel, Green_mean is a mean of the green channel, and Green_standardDeviation is a standard deviation of the green channel. Then, if the first non-green channel is the red channel, then the green channel may be adjusted to have a same mean and variance as the red channel according to:

Green_adjustedForRedCorrection=Green_normalized×Red_standardDeviation+Red_mean where Green_mean, Green_standardDeviation, Red_mean, and Red_standardDeviation may be calculated with respect to an original damaged area to recover. This way, Green_adjustedForRedCorrection has the mean of the distribution of the red channel and the standard deviation of the red channel. In some embodiments, acts 502 and 504 may not be performed. In other embodiments, acts 502 and 504 may be performed only when the green channel has amplitudes (or variances) that significantly differ from amplitudes of the non-green channels. Purple fringe reducer 308 may reconstruct values of the first non-green channel at damaged pixels using the Poisson blending approach with guidance from the first non-green channel adjusted distribution of values of the green channel produced during act 502 (act 504).

Purple fringe reducer 308 may then adjust the distribution of values of the green channel to have a same mean and variance as a distribution of values of a second non-green channel, such as, for example, another of the red channel or the blue channel (act 506). For example, if the second non-green channel is the blue channel, then the green channel may be adjusted to have a same mean and variance of the blue channel according to:

Green_adjustedForBlueCorrection=Green_normalized×Blue_standardDeviation+Blue_mean where Blue_mean, and Blue_standardDeviation may be calculated with respect to an original damaged area to recover. This way, Green_adjustedForBlueCorrection has the mean of the distribution of the blue channel and the standard deviation of the blue channel.

Purple fringe reducer 308 may reconstruct values of the second non-green channel at the damaged pixels using the Poisson blending approach with guidance from the second non-green channel adjusted distribution of values of the green channel produced during act 506 (act 508). The process may then be completed.

Approximated Poisson Blending Approach

In an alternate embodiment, an approximated Poisson blending approach, may use multilinear interpolation to reconstruct values of a blue channel and values of a red channel for pixels damaged by purple fringing artifacts.

In one embodiment of an approximated Poisson blending approach, for each of the damaged pixels to be reconstructed, nearest neighboring pixels on a fringe boundary may be calculated in a vertical direction and a horizontal direction, such as, for example, a north direction, an east direction, a south direction and a west direction. For example, when interpolating along a horizontal direction and vertical direction with respect to a pixel, p, damaged by purple fringing, an interpolated vertical component for a blue channel of the pixel, p, may be calculated by solving:

$$\frac{b_V(p) - b(s)}{b(n) - b(s)} = \frac{g(p) - g(s)}{g(n) - g(s)} \quad \text{(Eq. 6)}$$

where $b_V(p)$ is the interpolated vertical component for the blue channel of the pixel, p, which may be determined by solving Eq. 6, b(s) is a value of the blue channel at a nearest pixel on the fringe boundary in a south direction, b(n) is a value of the blue channel at a nearest pixel on the fringe boundary in a north direction, g(p) is a value of a green channel at the damaged pixel, p, g(s) is a value of the green channel at the nearest pixel on the fringe boundary in the south direction, and g(n) is a value of the green channel at the nearest pixel on the fringe boundary in the north direction.

Eq. 6 may be written as:

$$b_V(p) = \frac{(g(p) - g(s))(b(n) - b(s))}{g(n) - g(s)} + b(s) \quad \text{(Eq. 7)}$$

Similarly, an interpolated horizontal component for the blue channel at the damaged pixel, p, may be calculated by solving:

$$b_h(p) = \frac{(g(p) - g(e))(b(w) - b(e))}{g(w) - g(e)} + b(e) \quad \text{(Eq. 8)}$$

where $b_h(p)$ is the interpolated horizontal component for the blue channel of the damaged pixel, p, b(e) is a value of the blue channel at a nearest pixel on the fringe boundary in an east direction, b(w) is a value of the blue channel at a nearest pixel on the fringe boundary in the west direction, g(w) is a value of the green channel at the nearest pixel on the fringe boundary in the west direction, and g(e) is a value of the green channel at the nearest pixel on the fringe boundary in the east direction.

A value of the blue channel at the damaged pixel, p, may then be calculated by solving:

$$b = \frac{\text{Min}(Dist(p,n), Dist(p,s))^{-1} b_v + \text{Min}(Dist(p,e), Dist(p,w))^{-1} b_h}{\text{Min}(Dist(p,n), Dist(p,s))^{-1} + \text{Min}(Dist(p,e), Dist(p,w))^{-1}} \quad \text{(Eq. 9)}$$

where b is the value of the blue channel at the damaged pixel, p, Dist(p, n) is a distance from the damaged pixel, p, and the nearest pixel on the fringe boundary in the north direction, Dist(p, s) is a distance from the damaged pixel, p, and the nearest pixel on the fringe boundary in the south direction, Dist(p, e) is a distance from the damaged pixel, p, and the nearest pixel on the fringe boundary in the south direction, Dist(p, e) is a distance from the damaged pixel, p, and the nearest pixel on the fringe boundary in the east direction, and Min indicates a minimum value from a number of values in parentheses following Min. Eq. 9 ensures that the interpolated values are continuous at the fringe boundary, where dist tends towards zero.

Similarly, an interpolated vertical component for a red channel of the pixel, p, may be calculated by solving:

$$r_V(p) = \frac{(g(p) - g(s))(b(n) - r(s))}{g(n) - g(s)} + r(s) \quad \text{(Eq. 10)}$$

where r indicates the red channel. An interpolated horizontal component of the red channel of the pixel, p, may be calculated by solving:

$$r_h(p) = \frac{(g(p) - g(e))(r(w) - r(e))}{g(w) - g(e)} + r(e) \quad \text{(Eq. 11)}$$

A value of the red channel at the damaged pixel, p, may then be calculated by solving:

$$r = \frac{\text{Min}(Dist(p,n), Dist(p,s))^{-1} r_v + \text{Min}(Dist(p,e), Dist(p,w))^{-1} r_h}{\text{Min}(Dist(p,n), Dist(p,s))^{-1} + \text{Min}(Dist(p,e), Dist(p,w))^{-1}} \quad \text{(Eq. 12)}$$

where r is the value of the red channel at the pixel, p.

The above example illustrates multilinear interpolation using only a horizontal direction and a vertical direction. In other embodiments, additional, or other directions may also be used. For example, diagonal directions may be used instead of, or in addition to the horizontal direction and the vertical direction. In other embodiments, any number of directions may be used. Each of the directions may be a same number of degrees different from a previous direction and a next direction.

Eq. 6 through Eq. 12 may be generalized to:

$$c_i(p) = \frac{(g(p) - g(i+180°))(c(i) - c(i+180°))}{g(i) - g(i+180°)} + c(i+180°) \quad \text{(Eq. 13)}$$

where $c_i(p)$ represents an $i^{th}$ interpolated component value of a non-green color channel (red or blue) at one of the damaged pixels, indicated by p, $c(i+180°)$ is a value of the non-green color channel at a nearest undamaged pixel on a fringe boundary in a $(i+180°)$ direction, $c(i)$ is a value of the non-green color channel at the nearest undamaged pixel on the fringe boundary in an $i^{th}$ direction, $g(i+180°)$ is a value of the green channel at the nearest undamaged pixel on the fringe boundary in a $(i+180°)$ direction, and $g(i)$ is a value of the green channel at the nearest undamaged pixel on the fringe boundary in the $i^{th}$ direction.

A reconstructed value of the non-green color channel at the one of the damaged pixels may be determined according to:

$$c(p) = \frac{\sum_{i=1}^{N} \text{Min}(Dist(p, i), Dist(p, i+180°))^{-1} c_i(p)}{\sum_{i=1}^{N} \text{Min}(Dist(p, i), Dist(p, i+180°))^{-1}} \quad \text{(Eq. 14)}$$

where c(p) represents a reconstructed non-green color channel at the one of the damaged pixels, p, and N is a number of directions.

Figure 6:
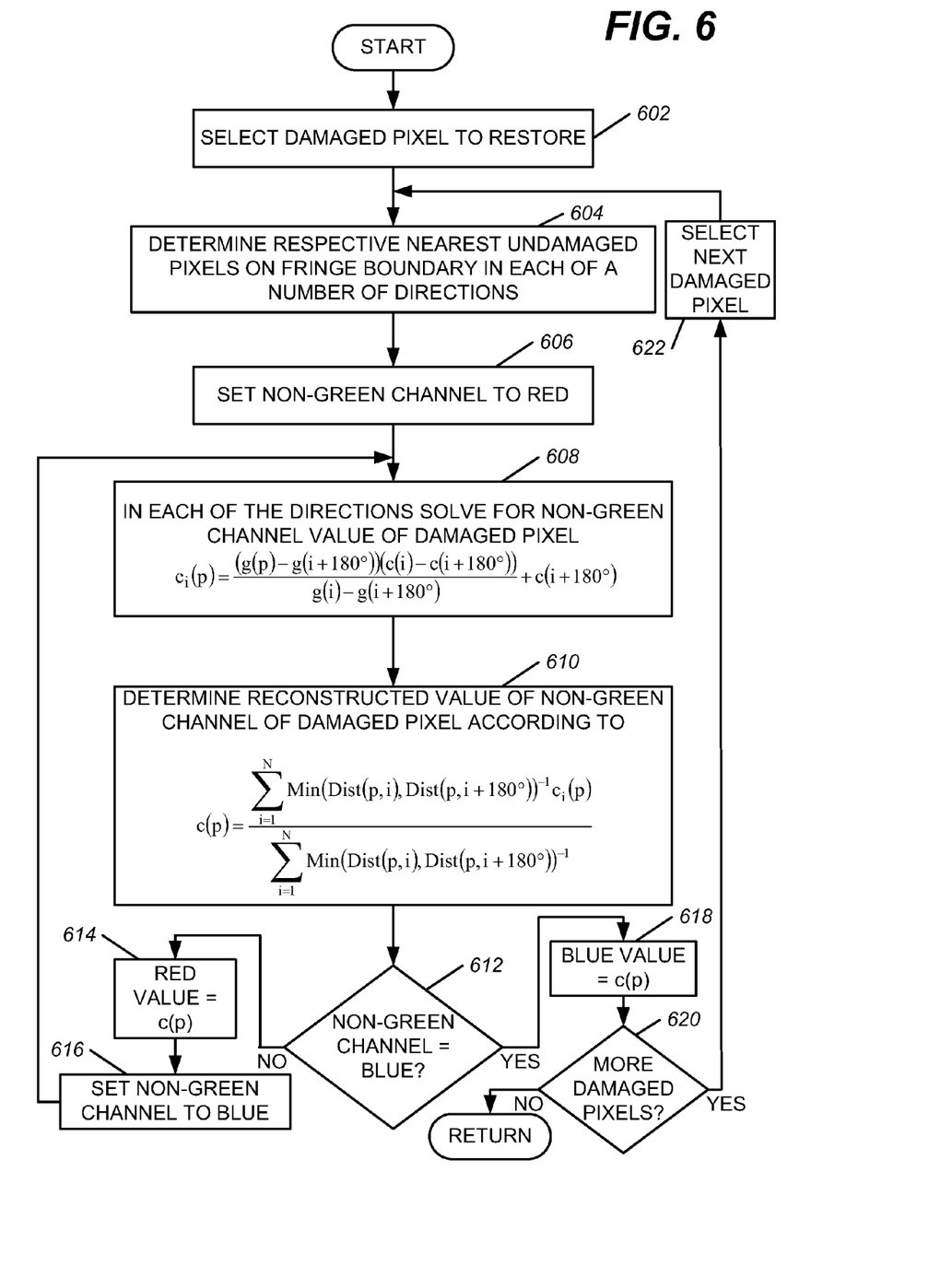
FIG. 6 is a flow chart illustrating exemplary processing in an embodiment using an approximated Poisson blending approach to reconstruct damaged pixels.

FIG. 6 is a flowchart illustrating an exemplary process for performing act 408 of FIG. 4 in an embodiment that reconstructs damaged pixels using a multilinear approach, which approximates a Poisson blending approach.

The process may begin with purple fringe reducer 308 using the map of damaged pixels to select a damaged pixel to restore (act 602). Purple fringe reducer 308 may then determine a respective nearest undamaged pixel on a fringe boundary in each of a number of directions, N (act 604). Purple fringe reducer 308 may then set a non-green channel to red (act 606).

For each of the N directions, purple fringe reducer 308 may determine a respective interpolated component of the non-green channel for the damaged pixel according to Eq. 13 (act 608). Purple fringe reducer 308 may then determine a reconstructed value of the non-green channel of the damaged pixel according to Eq. 14 (act 610).

Purple fringe reducer 308 may then determine whether both non-green channels of the damaged pixel have been reconstructed by determining whether the non-green channel is currently set to blue (act 612). If the non-green channel is not currently set to blue, then the value of the red channel at the damaged pixel may be set to the reconstructed value of the non-green channel, c(p) (act 614). Purple fringe reducer 308 may then set the non-green channel to blue (act 616) and acts 608-612 may again be performed.

If, during act 612, purple fringe reducer 308 determines that the non-green channel is currently set to blue, then purple fringe reducer 308 may set the value of the blue channel at the damaged pixel to the reconstructed value of the non-green channel, c(p) (act 618).

Purple fringe reducer 308 may then determine whether there are additional damaged pixels to restore (act 620). If no damaged pixels remain to be restored, the process may end. Otherwise, purple fringe reducer 308 may use the map of damaged pixels to select a next damaged pixel to restore (act 622) and acts 602-620 may again be performed.

Although the above-described exemplary embodiment illustrates first restoring the red channel value of the damaged pixel and then restoring the blue channel value of the damaged pixel, in other embodiments, an order of restoring a non-green channel value of the damaged pixel may be reversed. Alternatively, the red channel of all damaged pixels may be restored, and then the blue channel of all damaged pixels may be restored, or vice versa.

Miscellaneous

Although only a Poisson blending approach and a multilinear approximated Poisson blending approach have been discussed in detail, other approaches for reconstructing pixels damaged by purple fringing artifacts may be employed in other embodiments that reconstruct the damaged pixels by interpolation of undamaged pixels guided by the green channel.

In the above-mentioned approaches for using interpolation with guidance from the green channel, in some embodiments, better processing efficiency may be achieved by pre-calculating tables of values to be used during an interpolation process for reconstructing damaged pixels. For example, when using the multilinear approach, values may be pre-calculated and stored, such as: values of non-green channels for undamaged pixels on a fringe boundary; differences in values of the green channels at undamaged pixels on the fringe boundary at opposite ends of lines passing through the damaged pixels in a number of predefined directions, as well as additional, or other pre-calculated values.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process, such as the processes illustrated in FIGS. 4-6 may be different and/or may include additional or other acts.

Accordingly, the appended claims and their legal equivalents define embodiments, rather than any specific examples given.

I claim as my invention:

1. A method for reducing purple fringing artifacts within a digital image, the method comprises:
    applying, by a processing device, a linear filter to the digital image to identify at least one purplish candidate region within the digital image;
    detecting, by the processing device, a high gradient region within the digital image;

forming, by the processing device, a map of damaged pixels within the at least one purplish candidate region based on ones of a plurality of pixels within the at least one purplish candidate region being within a predefined distance from the detected high gradient region; and reconstructing, by the processing device, the damaged pixels using interpolation with guidance from a green channel, the reconstructing further comprising either a first method or a second method, the first method comprising:

adjusting a distribution of values of the green channel to have a same mean and variance as a distribution of values of a blue channel, thereby forming a blue-adjusted distribution of values of the green channel, reconstructing values of the blue channel of the damaged pixels by performing Poisson blending with guidance from the blue-adjusted distribution of values of the green channel, adjusting the distribution of values of the green channel to have a same mean and variance as a distribution of values of a red channel, thereby forming a red-adjusted distribution of values of the green channel, and reconstructing values of the red channel of the damaged pixels by performing Poisson blending with guidance from the red-adjusted distribution of values of the green channel; and the second method comprising:

selecting a pixel to restore from one of the damaged pixels, determining a nearest first pixel on a fringe boundary in a first predefined direction from one of the damaged pixels, determining a nearest second pixel on the fringe boundary in a second predefined direction from the one of the damaged pixels, the second predefined direction being opposite to the first predefined direction, solving a first equation $$c_1(p) = \frac{(g(p) - g(2))(c(1) - c(2))}{g(1) - g(2)} + c(2),$$

where $c_1(p)$ represents a first interpolated component value of a non-green color channel at the one of the damaged pixels, indicated by p, c(2) is a value of the non-green color channel at the nearest second pixel, c(1) is a value of the non-green color channel at the nearest first pixel, g(p) is a value of the green channel at the selected one of the damaged pixels, g(2) is a value of the green channel at the nearest second pixel, and g(1) is a value of the green channel at the nearest first pixel, determining a nearest third pixel on the fringe boundary in a third predefined direction from the selected one of the damaged pixels, determining a nearest fourth pixel on the fringe boundary in a fourth predefined direction from the selected one of the damaged pixels, the fourth predefined direction being opposite to the third predefined direction, solving a second equation $$c_2(p) = \frac{(g(p) - g(4))(c(3) - c(4))}{g(3) - g(4)} + c(4),$$

where $c_2(p)$ represents a second interpolated component value of the non-green color channel at the selected one of the damaged pixels, indicated by p, c(4) is a value of the non-green color channel at the nearest fourth pixel, c(3) is a value of the non-green color channel at the nearest third pixel, g(p) is a value of the green channel at the selected one of the damaged pixels, g(4) is a value of the green channel at the nearest fourth pixel, and g(3) is a value of the green channel at the nearest third pixel; and calculating a reconstructed value of the non-green color channel at the selected one of the damaged pixels based, at least partly, on the value of $c_1$ (P), $c_2$ (p), a minimum distance from the selected one of the damaged pixels to either the nearest third pixel or the nearest fourth pixel, and a minimum distance from the selected one of the damaged pixels to either the nearest first pixel or the nearest second pixel.

2. The method of claim 1, wherein the linear filter identifies the at least one purplish candidate region by finding a plurality of pixels having values in the red channel, the blue channel, and the green channel satisfying a plurality of inequalities of a form, $A_{ij} \times R + A_{ij+1} \times G + A_{ij+2} \times B > T_i$, where i=(1, 2, 3), j=(1, 2, 3), $A_{ij}, A_{ij+1}$, and $A_{ij+2}$ are multiplicative coefficients, $T_i$ is a threshold, R is a value of the red channel, B is a value of the blue channel, and G is a value of the green channel.

3. The method of claim 1, wherein:

the reconstructing further comprises the second method, and the second method further comprises:

selecting a next damaged pixel as the one of the damaged pixels; and repeating the determining of a nearest first pixel, the determining of a nearest second pixel, the solving of the first equation, the determining of a nearest third pixel, the determining of a nearest fourth pixel, the solving of the second equation, and the calculating of a reconstructed value of the non-green color channel at the selected one of the damaged pixels.

4. The method of claim 3, wherein each of the predefined directions is a same number of degrees from a previous predefined direction and a following predefined direction.

5. The method of claim 1, wherein the reconstructing of the damaged pixels further comprises:

reconstructing a value of the blue channel at selected one of the damaged pixels by performing a multilinear interpolation guided by the green channel; and reconstructing a value of the red channel at the selected one of the damaged pixels by performing another multilinear interpolation guided by the green channel.

6. The method of claim 1, further comprising:

pre-calculating, by a processor of the processing device, tables of values to be used during the reconstructing of the damaged pixels.

7. The method of claim 1, wherein the predefined distance from the detected high gradient region is either one pixel or two pixels.

8. A processing device for reducing purple fringing artifacts within a digital image, the processing device comprising:

a linear filter to be applied to the digital image to identify at least one purplish candidate region within the digital image;

a purple fringe detector to identify, as damaged, pixels in the at least one identified purplish candidate region that are within a predefined distance of a high gradient region;

a mapper to create a map of damaged pixels based on the pixels identified as damaged by the purple fringe detector; and a purple fringe reducer to reconstruct the damaged pixels using interpolation with guidance from a green channel, the purple fringe reducer reconstructing the damaged pixels using either a first method or a second method, the first method comprising:

adjusting a distribution of values of the green channel to have a same mean and variance as a distribution of values of a blue channel, thereby forming a blue-adjusted distribution of values of the green channel, reconstructing values of the blue channel of the damaged pixels by performing Poisson blending with guidance from the blue-adjusted distribution of values of the green channel, adjusting the distribution of values of the green channel to have a same mean and variance as a distribution of values of a red channel thereby, forming a red-adjusted distribution of values of the green channel, and reconstructing values of the red channel of the damaged pixels by performing Poisson blending with guidance from the red-adjusted distribution of values of the green channel; and the second method comprising:

selecting a pixel to restore from one of the damaged pixels, determining a respective nearest pixel on a fringe boundary in each of a plurality of directions from the selected one of the damaged pixels, solving a first equation $$c_i(p) = \frac{(g(p) - g(i + 180°))(c(i) - c(i + 180°))}{g(i) - g(i + 180°)} + c(i + 180°),$$

where $c_i(p)$ represents an $i^{th}$ interpolated component value of a non-green color channel at the selected one of the damaged pixels, indicated by p, c(i +180°) is a value of the non-green color channel at the respective nearest pixel on the fringe boundary in an (i+180°) direction from the selected one of the damaged pixels, c(i) is a value of the non-green color channel at the respective nearest pixel on the fringe boundary in an $i^{th}$ direction from the selected one of the damaged pixels, g(p) is a value of the green channel at the selected one of the damaged pixels, g(i+180°) is a value of the green channel at the respective nearest pixel on the fringe boundary in the (i +180°) direction from the selected one of the damaged pixels, and g(i) is a value of the green channel at the respective nearest pixel on the fringe boundary in the $i^{th}$ direction from the selected one of the damaged pixels, and calculating a reconstructed value of the non-green color channel at the selected one of the damaged pixels based, at least partly, on the values of $c_i(p)$, and respective minimum distances from the selected one of the damaged pixels to either the respective nearest pixel on the fringe boundary in the $i^{th}$ direction or the respective nearest pixel on the fringe boundary in the (i +180°) direction.

9. The processing device of claim 8, wherein an approximated Poisson blending approach and the map of damaged pixels are used to reconstruct each of the damaged pixels.

10. The processing device of claim 8, wherein the linear filter identifies the at least one purplish candidate region by finding a plurality of pixels having values in the red channel, the blue channel, and the green channel satisfying a plurality of inequalities of a form, $A_{ij} \times R + A_{ij+1} \times G + A_{ij+2} \times B > T_i$, where i=(1, 2, 3), j=(1, 2, 3), $A_{ij}$, $A_{ij+1}$, and $A_{ij+2}$ are multiplicative coefficients, $T_i$ is a threshold, R is a value of the red channel, B is a value of the blue channel, and G is a value of the green channel.

11. The processing device of claim 8, wherein the purple fringe reducer reconstructs each of the damaged pixels by interpolating, with guidance from the green channel, a value of the red channel and a value of the blue channel at each of the damaged pixels based, at least in part, on undamaged pixels on the fringe boundary.

12. The processing device of claim 11, wherein each of the damaged pixels is reconstructed using a Poisson blending approach.

13. The processing device of claim 11, wherein each of the damaged pixels is reconstructed using a multilinear interpolation approach.

14. The processing device of claim 13, wherein the purple fringe reducer restores the damaged pixels by performing the second method, the second method further comprising:

determining the reconstructed value of the non-green color channel at the selected one of the damaged pixels, c(p), according to $$c(p) = \frac{\sum_{i=1}^{N} \text{Min}(Dist(p, i), Dist(p, i + 180°))^{-1} c_i(p)}{\sum_{i=1}^{N} \text{Min}(Dist(p, i), Dist(p, i + 180°))^{-1}},$$

where N is a number of directions, Dist(p, i) is a distance from the selected one of the damaged pixels, p, to a nearest undamaged pixel on the fringe boundary in the $i^{th}$ direction, Dist(p, i+180°) is a distance from the selected one of the damaged pixels, p, to the nearest undamaged pixel on the fringe boundary in a direction that is 180° from the $i^{th}$ direction, and Min indicates a minimum of a plurality of values.

15. A machine-readable memory having information stored thereon for at least one processor to perform a method comprising:

applying a linear filter to a plurality of pixels of a digital image to identify ones of the plurality of pixels in at least one purplish candidate region within the digital image;

detecting a high contrast region within the digital image;

identifying, as damaged, ones of the identified ones of the plurality of pixels in the at least one purplish candidate region that are within a predefined distance of the detected high contrast region and forming a map of the damaged pixels; and using the map of damaged pixels to reconstruct damaged ones of the plurality of pixels of the digital image based, at least partly, on interpolating, with guidance from a green channel, non-green channel values of undamaged pixels on a fringe boundary, the damaged ones of the plurality of pixels being reconstructed according to either a first method or a second method, the first method comprising:

adjusting a distribution of values of the green channel to have a same mean and variance as a distribution of values of a blue channel, thereby forming a blue-adjusted distribution of values of the green channel, reconstructing values of the blue channel of the damaged pixels by performing Poisson blending with guidance from the blue-adjusted distribution of values of the green channel, adjusting the distribution of values of the green channel to have a same mean and variance as a distribution of values of a red channel thereby, forming a red-adjusted distribution of values of the green channel, and
reconstructing values of the red channel of the damaged pixels by performing Poisson blending with guidance from the red-adjusted distribution of values of the green channel; and the second method comprising:
selecting a pixel to restore from one of the damaged pixels,
determining a respective nearest pixel on a fringe boundary in each of a plurality of directions from the selected one of the damaged pixels,
solving a first equation $$c_i(p) = \frac{(g(p) - g(i+180°))(c(i) - c(i+180°))}{g(i) - g(i+180°)} + c(i+180°),$$

where $c_i(p)$ represents an $i^{th}$ interpolated component value of a non-green color channel at the selected one of the damaged pixels, indicated by p, $c(i+180°)$ is a value of the non-green color channel at the respective nearest pixel on the fringe boundary in an $(i+180°)$ direction from the selected one of the damaged pixels, $c(i)$ is a value of the non-green color channel at the respective nearest pixel on the fringe boundary in an $i^{th}$ direction from the selected one of the damaged pixels, $g(p)$ is a value of the green channel at the selected one of the damaged pixels, $g(i+180°)$ is a value of the green channel at the respective nearest pixel on the fringe boundary in the $(i+180°)$ direction from the selected one of the damaged pixels, and $g(i)$ is a value of the green channel at the respective nearest pixel on the fringe boundary in the $i^{th}$ direction from the selected one of the damaged pixels, and
calculating a reconstructed value of the non-green color channel at the selected one of the damaged pixels based, at least partly, on the values of $c_i(p)$, and respective minimum distances from the selected one of the damaged pixels to either the respective nearest pixel on the fringe boundary in the $i^{th}$ direction or the respective nearest pixel on the fringe boundary in the $(i+180°)$ direction.

16. The machine-readable memory of claim 15, wherein the linear filter identifies the at least one purplish candidate region by finding a plurality of pixels having values in the red channel, the blue channel, and the green channel satisfying a plurality of inequalities of a form, $A_{ij} \times R + A_{ij+1} \times G + A_{ij+2} \times B > T_i$, where $i = (1, 2, 3)$, $j = (1, 2, 3)$, $A_{ij}$, $A_{ij+1}$, and $A_{ij+2}$ are multiplicative coefficients, $T_i$ is a threshold, R is a value of the red channel, B is a value of the blue channel, and G is a value of the green channel.

17. The machine-readable memory of claim 15, wherein the reconstructing the damaged pixels further comprises:
using an approximated Poisson blending approach and the map of damaged pixels to reconstruct each of the damaged pixels.

18. The machine-readable memory of claim 17, wherein the approximated Poisson blending approach is a multilinear interpolation approach.

19. The machine-readable memory of claim 18, wherein the reconstructing the damaged pixels further comprises:
determining the reconstructed value of the non-green channel at the selected one of the damaged pixels, $c(p)$, according to $$c(p) = \frac{\sum_{i=1}^{N} Min(Dist(p, i), Dist(p, i+180°))^{-1} c_i(p)}{\sum_{i=1}^{N} Min(Dist(p, i), Dist(p, i+180°))^{-1}},$$

where N is a number of directions, $Dist(p,i)$ is a distance from the selected one of the damaged pixels to the respective nearest undamaged pixel on the fringe boundary in the $i^{th}$ direction $Dist(p, i+180°)$ is a distance from the selected one of the damaged pixels to the respective nearest undamaged pixel on the fringe boundary in a direction that is 180° from the $i^{th}$ direction, and Min indicates a minimum of a plurality of values.

20. The machine-readable memory of claim 19, wherein each of the plurality of directions is a same number of degrees different from an immediately preceding direction of the plurality of directions or an immediately following direction of the plurality of directions.

21. A device comprising:
a purple fringe reducer configured to reconstruct pixels of a digital image, wherein the pixels are damaged with purple fringing, the purple fringe reducer configured to reconstruct the damaged pixels using a method comprising:
adjusting a distribution of values of a green channel to have a same mean and variance as a distribution of values of a blue channel, thereby forming a blue-adjusted distribution of values of the green channel,
reconstructing values of the blue channel of the damaged pixels by performing blending with guidance from the blue-adjusted distribution of values of the green channel,
adjusting the distribution of values of the green channel to have a same mean and variance as a distribution of values of a red channel, thereby forming a red-adjusted distribution of values of the green channel, and
further reconstructing values of the red channel of the damaged pixels by performing further blending with guidance from the red-adjusted distribution of values of the green channel; and
a processor configured to execute the purple fringe reducer.

22. The device of claim 21, wherein the blending and the further blending are Poisson blending.

23. The device of claim 21, further comprising a purple fringe detector configured to identify the damaged pixels by performing acts comprising:
applying a linear filter to the digital image to identify at least one purplish candidate region within the digital image;
detecting a high gradient region within the digital image; and
forming a map of the damaged pixels within the at least one purplish candidate region based on individual pixels within the at least one purplish candidate region being within a predefined distance from the detected high gradient region.

24. A system comprising:
a purple fringe detector configured to identify, as damaged, pixels in at least one purplish candidate region that are within a predefined distance of a high gradient region;
a purple fringe reducer configured to reconstruct the damaged pixels using a method comprising:
adjusting a distribution of values of a green channel to have a same mean and variance as a distribution of values of a blue channel thereby forming a blue-adjusted distribution of values of the green channel,
reconstructing values of the blue channel of the damaged pixels by performing blending with guidance from the blue-adjusted distribution of values of the green channel,
adjusting the distribution of values of the green channel to have a same mean and variance as a distribution of values of a red channel thereby forming a red-adjusted distribution of values of the green channel, and further reconstructing values of the red channel of the damaged pixels by performing further blending with guidance from the red-adjusted distribution of values of the green channel; and a processor configured to execute the purple fringe detector or the purple fringe reducer.

25. The system of claim 24, wherein the system is embodied as a single device.

26. A machine-readable memory having information stored thereon that can be executed on at least one processor to perform a method comprising:

reconstructing damaged pixels of a digital image based, at least partly, on interpolating, with guidance from a green channel, non-green channel values of undamaged pixels on a fringe boundary, the reconstructing further comprising:

adjusting a distribution of values of the green channel to have a same mean and variance as a distribution of values of a first non-green channel thereby forming a first non-green-adjusted distribution of values of the green channel, reconstructing values of the first non-green channel of the damaged pixels by performing blending with guidance from the first non-green-adjusted distribution of values of the green channel, adjusting the distribution of values of the green channel to have a same mean and variance as a distribution of values of a second non-green channel thereby forming a second non-green-adjusted distribution of values of the green channel, and further reconstructing values of the second non-green channel of the damaged pixels by performing further blending with guidance from the second non-green-adjusted distribution of values of the green channel.

27. The machine-readable memory of claim 26, wherein the first non- green channel is a blue channel and the second non-green channel is a red channel.

28. A method comprising:

reconstructing a damaged pixel of a digital image, wherein the damaged pixel is damaged with purple fringing, the reconstructing further comprising:

determining a first pixel on a fringe boundary in a first predefined direction from the damaged pixel, determining a second pixel on the fringe boundary in a second predefined direction from the damaged pixel, the second predefined direction being opposite to the first predefined direction, finding a first interpolated component value of a non-green color channel at the damaged pixel, the first interpolation using a value of the non-green color channel at the first pixel, a value of the non-green color channel at the second pixel, a value of a green channel at the damaged pixel, a value of the green channel at the first pixel, and a value of the green channel at the second pixel, determining a third pixel on the fringe boundary in a third predefined direction from the damaged pixel, determining a fourth pixel on the fringe boundary in a fourth predefined direction from the damaged pixel, the fourth predefined direction being opposite to the third predefined direction, finding a second interpolated component value of the non-green color channel at the damaged pixel, the second interpolation using a value of the non-green color channel at the third pixel, a value of the non-green color channel at the fourth pixel, a value of the green channel at the damaged pixel, a value of the green channel at the third pixel, and a value of the green channel at the fourth pixel, and calculating a reconstructed value of the non-green color channel at the damaged pixel based, at least partly, on the first and second interpolated component values of the non-green color channel.

29. The method of claim 28, wherein the non-green color channel is a blue channel.

30. The method of claim 29, further comprising:

performing the reconstructing for a second non-green color channel, wherein the second non-green color channel is a red channel.

* * * * *